United States Patent
Iwata et al.

(10) Patent No.: US 11,700,468 B2
(45) Date of Patent: Jul. 11, 2023

(54) IMAGE CAPTURING APPARATUS, PHOTOELECTRIC CONVERSION SYSTEM, AND MOVING BODY

(71) Applicant: CANON KABUSHIKI KAISHA, Tokyo (JP)

(72) Inventors: Koichiro Iwata, Kanagawa (JP); Yu Arishima, Kanagawa (JP); Masaki Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 42 days.

(21) Appl. No.: 17/531,623

(22) Filed: Nov. 19, 2021

(65) Prior Publication Data
US 2022/0182571 A1   Jun. 9, 2022

(30) Foreign Application Priority Data
Dec. 4, 2020  (JP) .................. 2020-201485

(51) Int. Cl.
    *H04N 25/77* (2023.01)
    *G05D 1/02* (2020.01)
    *H04N 25/704* (2023.01)
    *H04N 25/75* (2023.01)

(52) U.S. Cl.
    CPC .......... *H04N 25/77* (2023.01); *G05D 1/0246* (2013.01); *H04N 25/704* (2023.01); *H04N 25/75* (2023.01)

(58) Field of Classification Search
    CPC ...... H04N 25/77; H04N 25/704; H04N 25/75; H04N 25/627; H04N 25/778; H04N 25/62; G05D 1/0246
    See application file for complete search history.

(56) References Cited

U.S. PATENT DOCUMENTS

| | | | |
|---|---|---|---|
| 2013/0181117 A1* | 7/2013 | Shimizu ................. | H04N 25/74 250/208.1 |
| 2015/0049225 A1* | 2/2015 | Iwane .................... | H04N 25/75 348/300 |
| 2016/0064442 A1* | 3/2016 | Takada ................. | H04N 25/616 250/208.1 |
| 2016/0212325 A1* | 7/2016 | Kikuchi .................. | G02B 7/28 |

FOREIGN PATENT DOCUMENTS

| | | |
|---|---|---|
| JP | 2013009207 A | 1/2013 |
| JP | 2013211833 A | 10/2013 |
| JP | 2015213260 A | 11/2015 |
| JP | 2017073687 A | 4/2017 |

* cited by examiner

*Primary Examiner* — Michael E Teitelbaum
(74) *Attorney, Agent, or Firm* — Canon U.S.A., Inc. IP Division

(57) ABSTRACT

An image capturing apparatus includes a plurality of pixels, a signal line connected to the plurality of pixels, and a limiter circuit configured to limit an amplitude of the signal at the signal line. A first pixel in the plurality of pixels sequentially outputs a noise signal, a focus detection signal, and an image capturing signal to the signal line. A second pixel in the plurality of pixels sequentially outputs a noise signal and an image capturing signal to the signal line, and wherein a potential of the signal at the signal line is set to a potential by the limiter circuit during a period after the second pixel outputs the noise signal and before the second pixel outputs the image capturing signal.

19 Claims, 10 Drawing Sheets

IMAGE CAPTURING APPARATUS, PHOTOELECTRIC CONVERSION SYSTEM, AND MOVING BODY

BACKGROUND

Technical Field

One disclosed aspect of the embodiments relates to an image capturing apparatus, a photoelectric conversion system, and a moving body.

Description of the Related Art

Japanese Patent Application Laid-Open No. 2013-211833 discusses an image capturing apparatus that outputs a signal for focus detection and a signal for image generation. In the image capturing apparatus, some pixels of a plurality of pixels output the signal focus detection to a signal line, and then output the signal for image generation to the signal line. Other pixels of the plurality of pixels output the signal for image generation to the signal line, without outputting the signal for focus detection. Thus, some pixels output the signal for focus detection before outputting the signal for image generation, and other pixels do not output the signal for focus detection.

SUMMARY

According to an aspect of the embodiments, an image capturing apparatus includes a plurality of pixels, a signal line connected to the plurality of pixels, and a limiter circuit configured to limit an amplitude of the signal line. A first pixel in the plurality of pixels sequentially outputs a noise signal, a focus detection signal, and an image capturing signal to the signal line. A second pixel in the plurality of pixels sequentially outputs a noise signal and an image capturing signal to the signal line. A potential of the signal line is set to a potential by the limiter circuit during a period after the second pixel outputs the noise signal and before the second pixel outputs the image capturing signal.

According to another aspect of the embodiments, an image capturing apparatus includes a plurality of pixels included in each of a plurality of photoelectric conversion units, a signal line to which the plurality of pixels is connected, and a limiter circuit configured to limit an amplitude of a signal at the signal line. A first pixel in the plurality of pixels sequentially outputs a noise signal, a first signal, and a second signal to the signal line. The first signal is based on an electric charge from some of the plurality of photoelectric conversion units. The second signal is based on an electric charge from the plurality of photoelectric conversion units. A second pixel in the plurality of pixels outputs a noise signal and a third signal to the signal line. The third signal is based on the electric charge from the plurality of photoelectric conversion units. A potential of the signal at the signal line is set to a potential by the limiter circuit during a period after the second pixel outputs the noise signal and before the second pixel outputs the third signal.

Further features of the disclosure will become apparent from the following description of exemplary embodiments with reference to the attached drawings.

DESCRIPTION OF THE EMBODIMENTS

A potential of a signal at a signal line before a signal for image generation is output to the signal line varies depending on whether a signal for focus detection is output. Accordingly, when the signal for image generation is output to the signal line, the degree of stabilization of the potential of the signal line is likely to vary depending on whether the signal for focus detection is output. This leads to a deterioration in the accuracy of the signal for image generation. One aspect of exemplary embodiments to be described below relates to a technique for suppressing the deterioration in the accuracy of the signal for image generation.

Exemplary embodiments of the disclosure will be described below with reference to the drawings.

A conductivity type of each transistor described in the following exemplary embodiments is merely an example and is not limited only to the conductivity type described in the exemplary embodiments. The conductivity type of each transistor described in the exemplary embodiments can be changed as appropriate. In a case where the conductivity type of each transistor is changed, the potential at the gate, source, and drain of the transistor is changed as appropriate.

For example, in a transistor that is caused to operate as a switch, a low (Lo) level and a high (Hi) level of a potential to be supplied to the gate of the transistor may be reversed to levels opposite to those described in the exemplary embodiments when the conductivity type of the transistor is changed. Also, the conductivity type of each semiconductor region described in the following exemplary embodiments is merely an example and is not limited only to the conductivity type described in the exemplary embodiments. The conductivity type of each semiconductor region described in the exemplary embodiments can be changed as appropriate. In a case where the conductivity type of each semiconductor region is changed, the potential of the semiconductor region is changed as appropriate.

Figure 1:
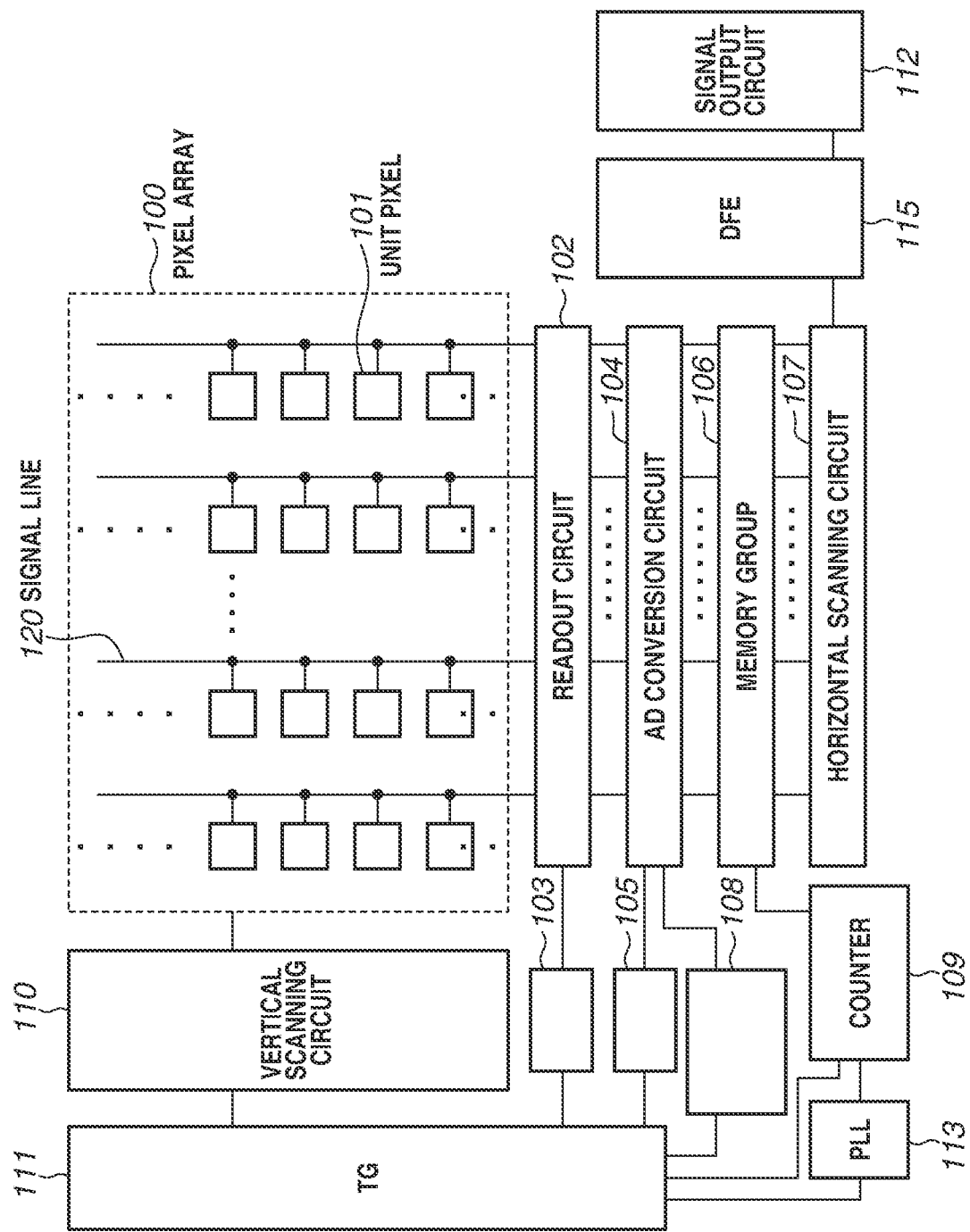
FIG. 1 is a block diagram illustrating a configuration example of an image capturing apparatus according to a first exemplary embodiment.

A first exemplary embodiment will now be described. FIG. 1 is a block diagram illustrating a configuration example of an image capturing apparatus according to the first exemplary embodiment. The image capturing apparatus includes a pixel array 100. The pixel array 100 includes a plurality of pixels 101 (also referred to as unit pixels) arranged in a plurality of rows and a plurality of columns. A plurality of signal lines 120 is disposed such that the signal lines 120 correspond to the respective columns of the pixels 101. While the present exemplary embodiment illustrates a configuration in which one signal line 120 is provided for one column of pixels 101, two or more signal lines 120 may be provided for one column of pixels 101.

The image capturing apparatus also includes a readout circuit 102. The readout circuit 102 is provided with a plurality of unit circuits respectively corresponding to the plurality of signal lines 120. The image capturing apparatus also includes a first bias circuit 103 that controls driving of the readout circuit 102 and supplies a reference bias.

The image capturing apparatus also includes an analog-to-digital (AD) conversion circuit 104 that converts a signal output from the readout circuit 102 into a digital signal. The AD conversion circuit 104 is provided with a plurality of AD converters respectively corresponding to the plurality of unit circuits included in the readout circuit 102. The image capturing apparatus includes a second bias circuit 105 that controls driving of the AD conversion circuit 104 and supplies the reference bias. The image capturing apparatus also includes a reference signal supply circuit 108 that supplies a reference signal (ramp signal) used for the AD conversion circuit 104 to perform an AD conversion.

The image capturing apparatus also includes a memory group 106 that holds the digital signal generated by the AD conversion circuit 104. The memory group 106 includes a plurality of memory elements respectively corresponding to the plurality of AD converters included in the AD conversion circuit 104. A count signal indicating a lapse of time is input to the memory group 106 from a counter 109. The counter 109 generates the count signal indicating the lapse of time by using clock pulses output from a phase-locked loop (PLL) circuit 113.

The image capturing apparatus also includes a horizontal scanning circuit 107. The horizontal scanning circuit 107 sequentially selects the memory elements in each column of the memory group 106, and sequentially outputs the digital signals held in the memory elements to a digital front end (DFE) 115. The DFE 115 performs a correction process for reducing noise and errors and various calculation processes, such as calculation (addition, subtraction, etc.) processes to be performed between digital signals, on the digital signals output from the horizontal scanning circuit 107. The DFE 115 outputs the processed digital signals to a signal output circuit 112.

The image capturing apparatus also includes a vertical scanning circuit 110. The vertical scanning circuit 110 selects a row of the plurality of pixels 101 disposed in the pixel array 100. The pixels 101 in the row selected by the vertical scanning circuit 110 output signals to the corresponding signal line 120.

The image capturing apparatus also includes a timing generator (TG) 111. The TG 111 controls driving of each of the vertical scanning circuit 110, the first bias circuit 103, the second bias circuit 105, the reference signal supply circuit 108, the counter 109, and the PLL circuit 113.

Figure 2:
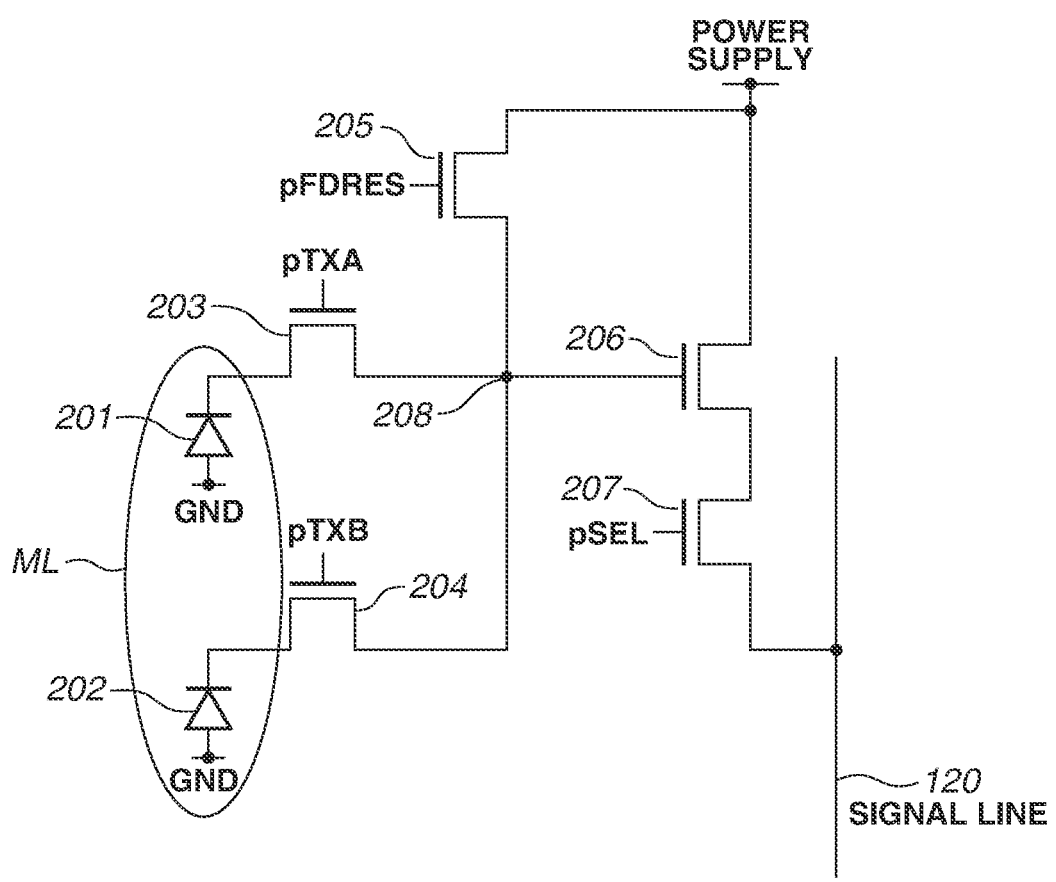
FIG. 2 is a circuit diagram illustrating a configuration example of a pixel.

FIG. 2 is a circuit diagram illustrating a configuration example of each pixel 101.

The pixel 101 includes photoelectric conversion units 201 and 202. The photoelectric conversion units 201 and 202 are typically photodiodes. The pixel 101 also includes transfer transistors 203 and 204. The transfer transistor 203 is connected to the photoelectric conversion unit 201 and a floating diffusion (FD) 208. A signal pTXA is input to the gate of the transfer transistor 203 from the vertical scanning circuit 110 illustrated in FIG. 1. The transfer transistor 204 is connected to the photoelectric conversion unit 202 and the FD 208. A signal pTXB is input to the gate of the transfer transistor 204 from the vertical scanning circuit 110 illustrated in FIG. 1. The photoelectric conversion units 201 and 202 are provided corresponding to one microlens ML.

The pixel 101 also includes a reset transistor 205. The reset transistor 205 is connected to a power supply and the FD 208. A signal pFDRES is input to the gate of the reset transistor 205 from the vertical scanning circuit 110.

The pixel 101 also includes an amplification transistor 206. The gate of the amplification transistor 206 is connected to the FD 208. The amplification transistor 206 is connected to the power supply and a selection transistor 207.

A signal pSEL is input to the gate of the selection transistor 207 from the vertical scanning circuit 110. The selection transistor 207 is connected to the corresponding signal line 120.

The transfer transistors 203 and 204, the reset transistor 205, the amplification transistor 206, and the selection transistor 207, which are included in the pixel 101, are n-type metal-oxide semiconductor (MOS) transistors. The transfer transistors 203 and 204, the reset transistor 205, and the selection transistor 207 are turned on when the signal received from the vertical scanning circuit 110 is at Hi level. The transfer transistors 203 and 204, the reset transistor 205, and the selection transistor 207 are turned off when the signal received from the vertical scanning circuit 110 is at Lo level.

Figure 3:
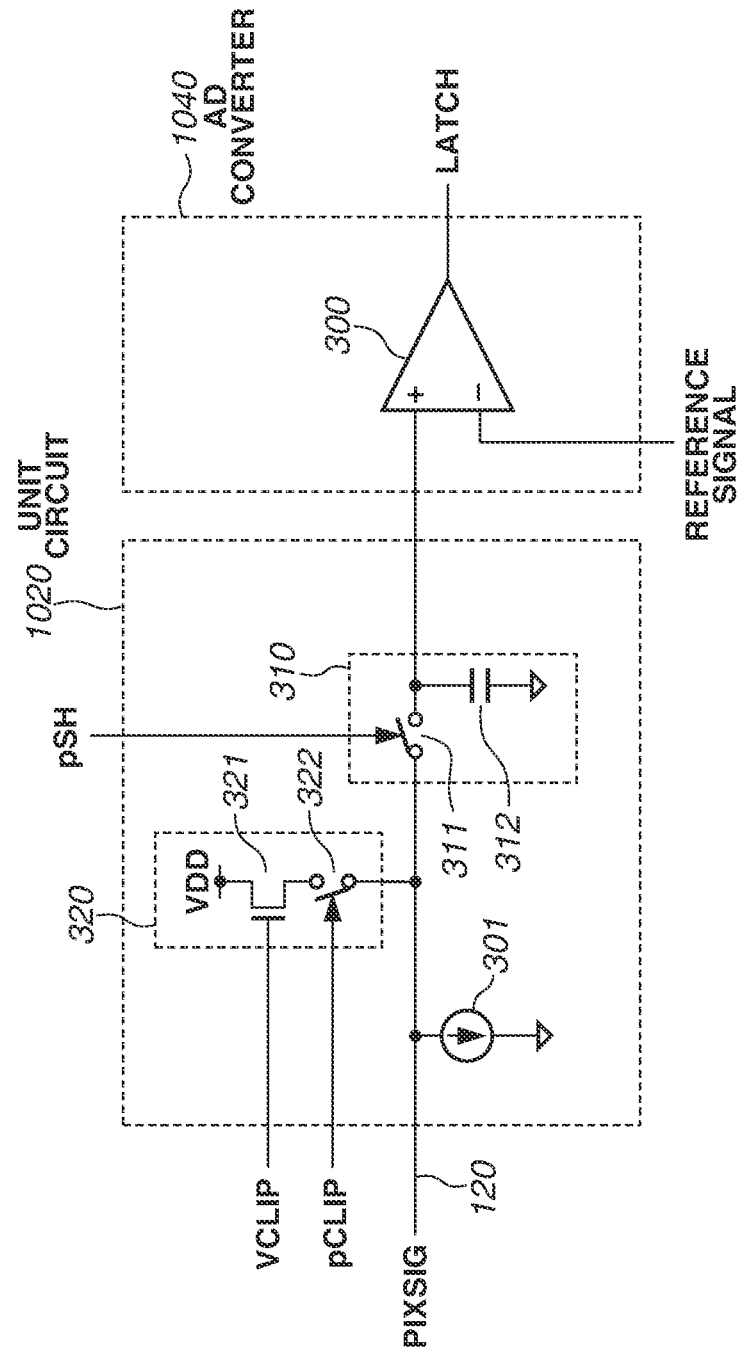
FIG. 3 is a circuit diagram illustrating configuration examples of a readout circuit and an analog-to-digital (AD) conversion circuit.

FIG. 3 is a circuit diagram illustrating a unit circuit 1020 included in the readout circuit 102 illustrated in FIG. 1 and an AD converter 1040 included in the AD conversion circuit 104 illustrated FIG. 1. The readout circuit 102 is provided with a plurality of unit circuits 1020 as described above with reference to FIG. 1. The AD conversion circuit 104 is provided with a plurality of AD converters 1040 as described above with reference to FIG. 1.

The unit circuit 1020 includes a current source load 301. The current source load 301 controls the amount of current flowing through the corresponding signal line 120. The unit circuit 1020 also includes a sample-and-hold (SH) circuit 310. The SH circuit 310 includes a switch 311 and a capacitor element 312. The switch 311 is controlled by a signal pSH output from the TG 111 illustrated in FIG. 1. A signal output from the pixel 101 to the corresponding signal line 120 is represented as a signal PIXSIG.

The unit circuit 1020 also includes a limiter circuit 320. The limiter circuit 320 includes a clip transistor 321 and a switch 322. The switch 322 is controlled by a signal pCLIP output from the TG 111. A voltage VCLIP is input to the gate of the clip transistor 321 from the first bias circuit 103. The limiter circuit 320 is a circuit that limits a range in which the potential of the signal at the signal line 120 is variable. Specifically, the clip transistor 321 clips the potential of the corresponding signal line 120 with a potential (referred to as a clip potential) that is decreased from the voltage VCLIP by the amount corresponding to a threshold voltage Vth and an overdrive voltage for causing a current value determined by the current source load 301 to flow. In other words, the potential of the corresponding signal at the signal line 120 is limited so as not to vary beyond the clip potential.

The AD converter 1040 includes a comparator 300. A reference signal RAMP is input to the comparator 300 from the reference signal supply circuit 108 illustrated in FIG. 1. The reference signal RAMP is a signal whose potential changes with time, and is also referred to as a ramp signal. The potential of the reference signal RAMP may change in a slope, or may change in a step-like fashion. The variation of the potential may change while the potential is changing.

Figure 4A:
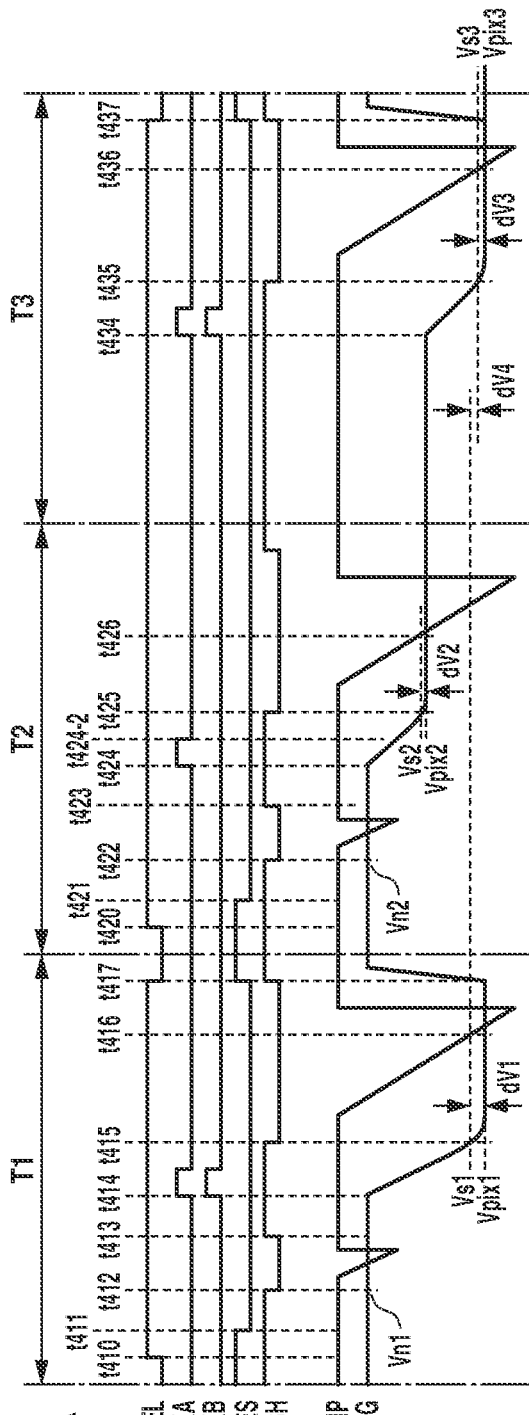
FIGS. 4A and 4B are timing diagrams each illustrating an operation of the image capturing apparatus.

FIG. 4A is a timing diagram illustrating an operation of the image capturing apparatus according to a reference example. In this reference example, the image capturing apparatus has a configuration in which the limiter circuit 320 illustrated in FIG. 3 is omitted.

In this reference example, each pixel 101 in an Nth row outputs a noise signal and a signal for image generation (image capturing signal). Each pixel 101 in an (N+1)th row outputs a noise signal, a signal for focus detection (focus detection signal), and an image capturing signal.

A period T1 is a period in which the signal for image generation in the Nth row is read out. A period T2 is a period in which the signal for focus detection in the (N+1)th row is read out. A period T3 is a period in which the signal for image generation in the (N+1)th row is read out.

At time t410, the vertical scanning circuit 110 switches the signal pSEL to Hi level. Thus, the selection transistor 207 in each pixel 101 in the Nth row is turned on and the amplification transistor (SF) 206 is connected to the corresponding signal line 120.

Further, the vertical scanning circuit 110 switches the signal pFDRES to Hi level, so that the reset transistor 205 is turned on. Thus, the FD 208 is reset to a voltage based on a power supply voltage. Typically, the voltage based on the power supply voltage is obtained by subtracting a threshold voltage of the reset transistor 205 from the power supply voltage.

At time t411, the vertical scanning circuit 110 switches the signal pFDRES to Lo level. Thus, the reset transistor 205 is turned off and the FD 208 is in a floating state. Noise is caused in the HD 208 due to a change of the state of the reset transistor 205 from the turned-on state to the turned-off state. A charge injection caused by the reset transistor 205 mainly appears as noise. In this case, when the signal PIXSIG at the corresponding signal line 120 is used as a signal Vn1, the signal Vn1 is a noise signal.

During a period from the start of the period T1 to time t412, the TG 111 switches the signal pSH to Hi level. Thus, the switch 311 is turned on and the signal Vn1 is input to the capacitor element 312 (sampling). The TG switches the signal pSH to Lo level. As a result, the switch 311 is turned off and the capacitor element 312 holds the signal Vn1.

During a period from time, t412 to time t413 in which the signal pSH is at Lo level, the reference signal RAMP changes and the AD conversion is performed on the signal held by the SH circuit 310. The count signal corresponding to a timing when the magnitude relationship between the potential of the signal Vn1 and the potential of the reference signal RAMP is reversed is obtained as the digital signal corresponding to the signal Vn1. A period in which the reference signal RAMP changes and the signal Vn1 is converted into the digital signal is referred to as a period NAD.

During a period from time t413 to time t415 after the NAD conversion period, the TG 111 switches the signal pSH to Hi level again. Thus, the signal PIXSIG is input to the capacitor element 312.

At time t414, the vertical scanning circuit 110 switches the signal pTXA and the signal pTXB to Hi level. Thus, the transfer transistors 203 and 204 are turned on. Accordingly, electric charges generated in the photoelectric conversion units 201 and 202 are transferred to the FD 208.

The voltage of the FD 208 decreases due to the electric charges transferred from the photoelectric conversion units 201 and 202.

As the voltage of the FD 208 decreases, the signal PIXSIG also decreases from the potential of the signal Vn1. In this case, the signal PIXSIG decreases to the level of a signal Vpix1.

In this reference example, at time t415, the TG 111 switches the signal pSH to Lo level. Time t415 is before the potential of the corresponding signal at the signal line 120 has decreased to the level of the signal Vpix1 (before stabilization). As a result, the signal held by the capacitor element 312 corresponds to a signal Vs1 whose potential is higher than the potential of the signal Vpix1.

After time t415, the potential of the reference signal RAMP starts to change and the AD conversion is performed on the signal Vs1 held by the capacitor element 312.

At time t416, the magnitude relationship between the potential of the signal Vs1 and the potential of the reference signal RAMP is reversed. At this timing, the comparator 300 outputs a signal LATCH to the corresponding memory element of the memory group 106. The count signal corresponding to this timing is written into the corresponding memory element of the memory group 106. A period in which the potential of a reference signal VRAMP is changing is referred to as a period S1.

Assuming that a difference between a true image capturing signal ΔVpix1 in the Nth row and an image capturing signal ΔVs1 subjected to the AD conversion is represented by dV1, the difference dV1 is obtained by the following equation (1).

$$dV1 = Vpix1 - Vs1 \tag{1}$$

As seen from Equation (1), when the signal pSH becomes Lo level at time t415, the signal PIXSIG has not decreased to the level of the signal Vpix1, and therefore the AD conversion is performed on the image capturing signal that is smaller than the original image capturing signal by the amount corresponding to the difference dV1.

After that, at time t417, the vertical scanning circuit 110 switches the signal pSEL to Lo level. Thus, the selection transistor 207 in each pixel 101 in the Nth row is turned off.

Next, at time t417, the vertical scanning circuit 110 switches the pSEL to be output to each pixel 101 in the (N+1)th row to Hi level. Thus, the selection transistor 207 in the (N+1)th row is turned on and is connected to the corresponding signal line 120.

During a period from time t417 to time t423, an operation of reading out the noise signal from each pixel 101 in the Nth row and an operation similar to the AD conversion operation on the noise signal are also performed on each pixel 101 in the (N+1)th row.

At time t424, the vertical scanning circuit 110 switches the signal pTXA to Hi level. Thus, the transfer transistor 203 in each pixel 101 in the (N+1)th row is turned on and the electric charge generated in the photoelectric conversion unit 201 is transferred to the FD 208. In this case, the signal pTXB is maintained at Lo level, and thus the electric charge generated in the photoelectric conversion unit 202 is not transferred to the FD 208 at this point of time. The signal PIXSIG decreases toward the level of a signal Vpix2 that is a signal potential corresponding to the electric charge generated in the photoelectric conversion unit 201.

At time t424-2, the vertical scanning circuit 110 switches the signal pTXA to Lo level.

At time t425, the TG 111 switches the signal pSH to Lo level. Time t425 is before the potential of the corresponding signal line 120 is stabilized. Thus, the capacitor element 312 holds a signal Vs2 as a potential higher than that of the signal Vpix2.

After that, the potential of the reference signal RAMP changes and the AD conversion circuit 104 converts the signal Vs2 into a digital signal. A period in which the potential of the reference signal RAMP changes and the AD conversion is performed on the signal based on the electric charge generated in the photoelectric conversion unit 201 is referred to as a period S2.

After the AD conversion period, the TG 111 switches the signal pSH to Hi level again.

At time t434, the vertical scanning circuit 110 switches the signal pTXA and the signal pTXB to Hi level. Thus, the transfer transistors 203 and 204 in the (N+1)th row are turned on. Accordingly, the electric charge generated in the photoelectric conversion unit 201 at time t424-2 and subsequent times and the electric charge generated in the photoelectric conversion unit 202 are transferred to the FD 208.

As a result, the signal VSIGPIX decreases from the level of the Vpix2 toward the level of a signal Vpix3 that is a signal potential corresponding to the electric charges generated in the photoelectric conversion units 201 and 202.

After that, the vertical scanning circuit 110 switches the signal pTXA and the signal pTXB to Lo level.

To simplify the explanation, assume that the signal Vpix3 has the same potential as the signal Vpix1 in each pixel 101 in the Nth row. Also, assume that the signal Vpix2 (signal corresponding to the electric charge generated in the photoelectric conversion unit 201) is a signal having an amplitude that is ½ of the signal Vpix3 (signal corresponding to the electric charges generated in the photoelectric conversion units 201 and 201).

The variation of the potential of the corresponding signal at the signal line 120 during the period T3 is represented by the following compound equation (2).

$$Vpix3 - Vpix2 = Vpix1 - (\frac{1}{2} \cdot Vpix1) = \frac{1}{2} \cdot Vpix1 \quad (2)$$

At time t435, the TG 111 switches the signal pSH to Lo level. Time t435 is before the potential of the corresponding signal at the signal line 120 is stabilized. In this case, a signal Vs3 from the corresponding signal line 120 is held by the capacitor element 312. The signal Vs3 has a potential higher than that of the signal Vpix3.

A period from time t435 to time t436 corresponds to the above-described period S1, and the AD conversion is performed on the signal Vs3.

As seen from compound equation (2), the amplitude of the corresponding signal at the signal line 120 during the period T3 is about half the period T1. Accordingly, at time t435, the amplitude of the corresponding signal at the signal line 120 is closer to the signal Vpix. Specifically, the potential of the signal Vs3 to be written into the capacitor element 312 is lower than the potential of the signal Vs3 during the period T1. Therefore, the signals Vpix1 and Vpix3 are the same, but the image capturing signal subjected to the AD conversion during the period T3 is larger than the image capturing signal obtained during the period T1.

For this reason, when the image is generated, a horizontal line is generated due to the difference between the image capturing signal obtained during the period T1 and the image capturing signal subjected to the AD conversion during the period T3.

Figure 4B:
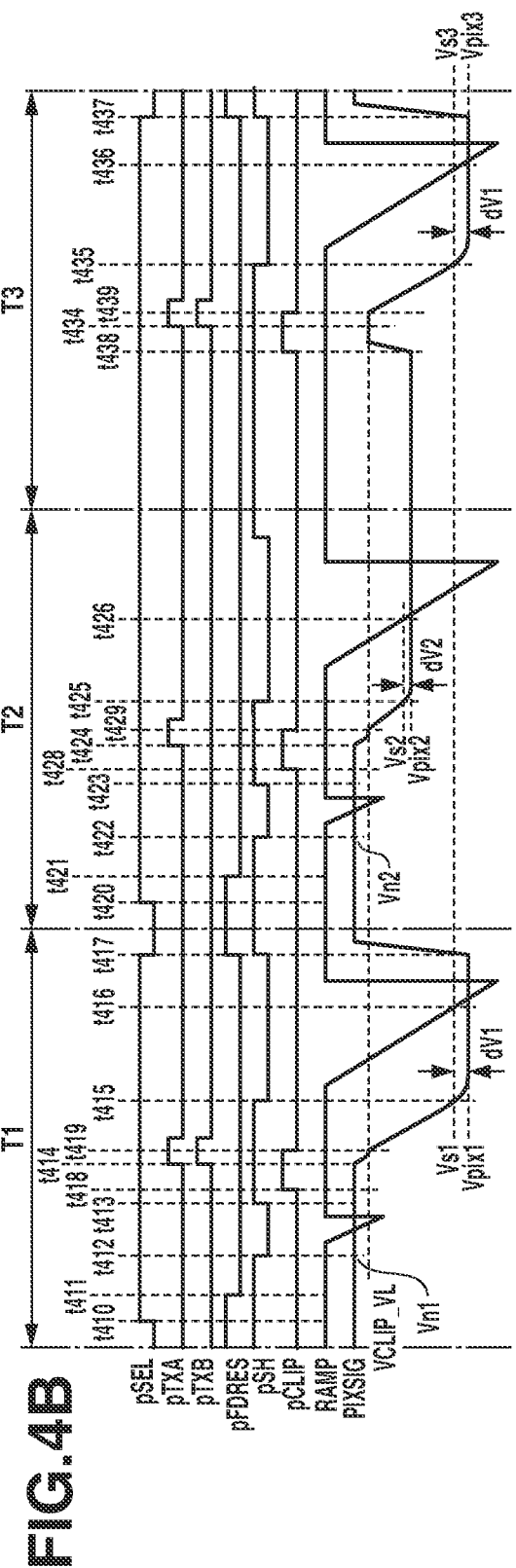

FIG. 4B is a timing diagram illustrating an operation of the image capturing apparatus according to the present exemplary embodiment.

Each operation at the times denoted by the same reference symbols as those in FIG. 4A is similar to that in FIG. 4A, and thus the descriptions thereof are omitted.

During a period from time t418 to time t419 in the period T1, the TG 111 switches the signal pCLIP to Hi level. Thus, the switch 322 in the limiter circuit 320 is turned on. Accordingly, the clip transistor 321 in the limiter circuit 320 is connected to the corresponding signal line 120. In this case, the gate voltage of the clip transistor 321 is set to a voltage in the vicinity of a reset level of the FD 208 in the pixel 101.

At time t414, the transfer transistors 203 and 204 are turned on and the electric charges obtained by the photoelectric conversion in the photoelectric conversion units 201 and 202 are transferred to the FD 208. Accordingly, the potential of the corresponding signal at the signal line 120 starts to decrease.

Before time t419, the corresponding signal at the signal line 120 reaches a signal VCLIP_VL. In this case, the signal VCLIP_VL has a potential fixed when the clip transistor 321 operates.

Until time t419, the signal pCLIP is maintained at Hi level. Accordingly, the clip transistor 321 prevents the potential of the corresponding signal at the signal line 120 from decreasing to the level of the signal VCLIP_VL or lower.

At time t419, the signal pCLIP becomes Lo level and the clip transistor 321 is disconnected from the corresponding signal line 120. As a result, the fixed state of the corresponding signal at the signal line 120 to the signal VCLIP_VL is released and the potential of the corresponding signal at the signal line 120 starts to decrease depending on the amount of electric charges generated through the photoelectric conversion. An operation during a period from time t415 to time t417 is similar to that described above with reference to FIG. 4A, and thus the description thereof is omitted.

The potential of the corresponding signal at the signal line 120 is set to the level of the signal VCLIP_VL during the period from time t418 to time t419.

During a period from time t428 to time t429 in the period T2, the clip transistor 321 and the switch 322 perform an operation similar to that during the period from time t418 to time t419 in the period T1. As a result, the range in which the potential of the corresponding signal at the signal line 120 changes is limited to the level of the signal VCLIP_VL.

Next, during a period from time t438 to time t439 in the period T3, the clip transistor 321 and the switch 322 perform an operation similar to that during the period from time t418 to time t419 in the period T1 and during the period from time t428 to time t429 in the period T2. Thus, also in the period T3, the range is set to the level of the signal VCLIP_VL, during a period from time t434 to time t435.

In the present exemplary embodiment, in each of the period T1, the period T2, and the period T3, the potential of the corresponding signal at the signal line 120 is set to the same potential of the signal VCLIP_VL once during a period in which the electric charges generated in the photoelectric conversion units 201 and 202 are transferred to the FD 208.

The above-described configuration enables the potential to start to change toward the signal Vpix1 and the signal Vpix3 from the same potential of the signal VCLIP_VL.

In the present exemplary embodiment, during a predetermined period before the image capturing signal is output, the potential of the corresponding signal at the signal line 120 is set to the signal VCLIP_VL. Examples of the predetermined period include a period from time t418 to t419, a period from time t428 to t429, and a period from time t438 to t439.

As described above, the potential can start to change toward the image capturing signal from the same start point, regardless of whether the signal for focus detection is output before the image capturing signal. Therefore, inconsistency between conditions for stabilizing the image capturing signal depending on whether the signal for focus detection is output can be reduced. Consequently, the deterioration in the accuracy of the image capturing signal can be suppressed.

In the present exemplary embodiment, the signal pCLIP is switched to Lo level during a period in which the signal pTXA or the signal pTXB is at Hi level. However, the signal pCLIP may be switched to Lo level after the signal pTXA or the signal pTXB becomes Lo level. Alternatively, the signal pCLIP may be switched to Lo level at the same time when the signal pTXA or the signal pTXB becomes Hi level.

To enhance the advantageous effect of the present exemplary embodiment, the length of a period from a timing when the signal pCLIP becomes Lo level to a timing when the signal pSH becomes Lo level may desirably match between at least the period T1 and the period T3.

In the present exemplary embodiment, the SH circuit 310 is provided and the signal PIXSIG is held by the capacitor element 312. However, the SH circuit 310 may be omitted. Even when the SH circuit 310 is provided, the switch 311 may be maintained in the on-state without holding the signal. In this case, the length of a period from a time when the signal pCLIP becomes Lo level to a time when the AD conversion is started may desirably match between at least the period T1 and the period T3, thereby making it possible to obtain an advantageous effect similar to that of the present exemplary embodiment.

Further, in the present exemplary embodiment, each pixel 101 in the Nth row outputs the noise signal and the signal for image generation (image capturing signal). Each pixel 101 in the (N+1)th row outputs the noise signal, the signal for focus detection, and the image capturing signal. The position of each pixel 101 from which the signals are output is not limited to the above-described row position, and can be changed as appropriate. Specifically, the row of pixels 101 from which the noise signal and the signal for image generation (image capturing signal) are output can be changed as appropriate, and the row of pixels 101 from which the noise signal, the signal for focus detection, and the image capturing signal are output can be changed as appropriate. The row to be selected may be changed for each frame.

Differences between a second exemplary embodiment and the first exemplary embodiment will be mainly described.

Figure 5:
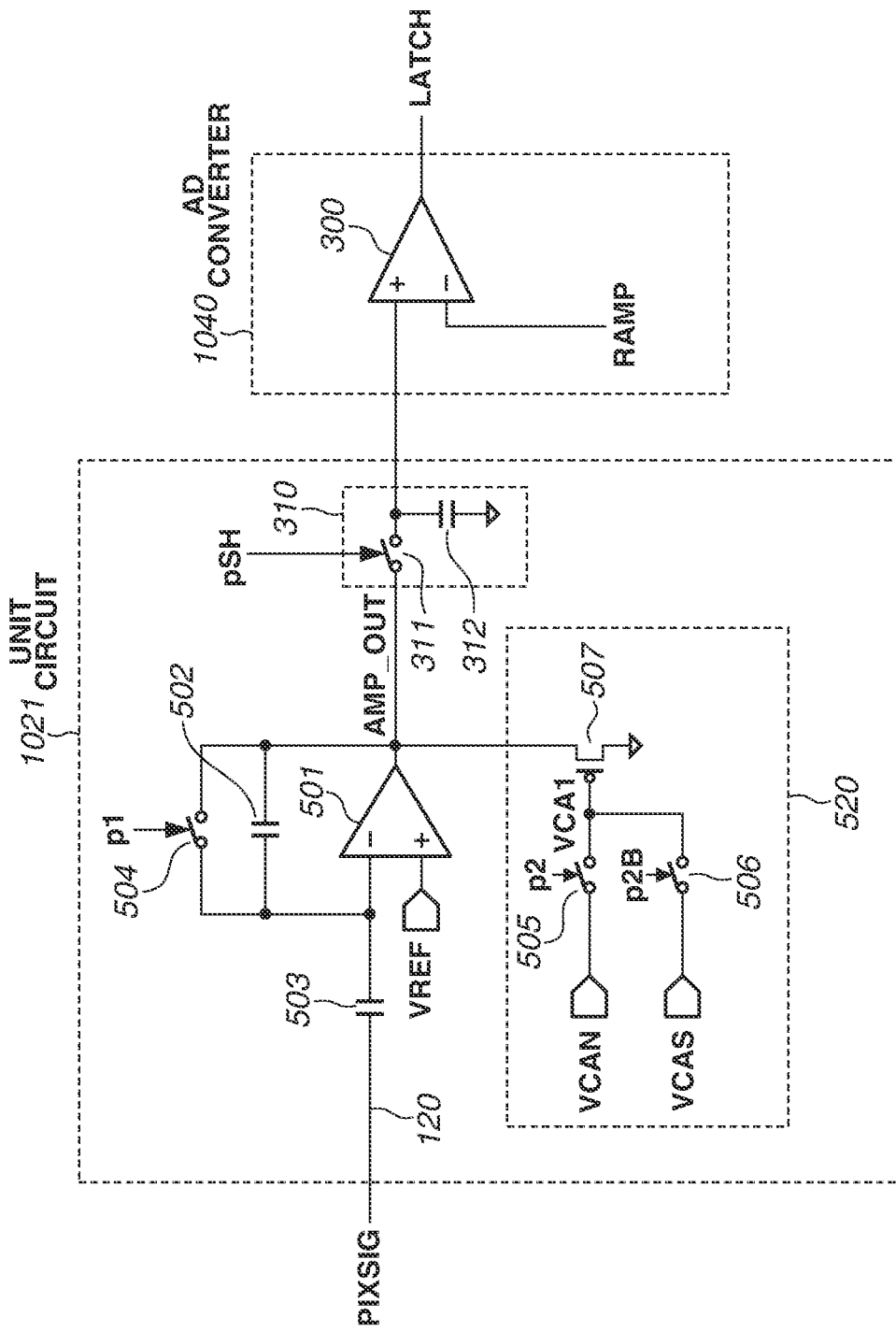
FIG. 5 is a circuit diagram illustrating configuration examples of the readout circuit and the AD conversion circuit according to a second exemplary embodiment.
Figure 6:
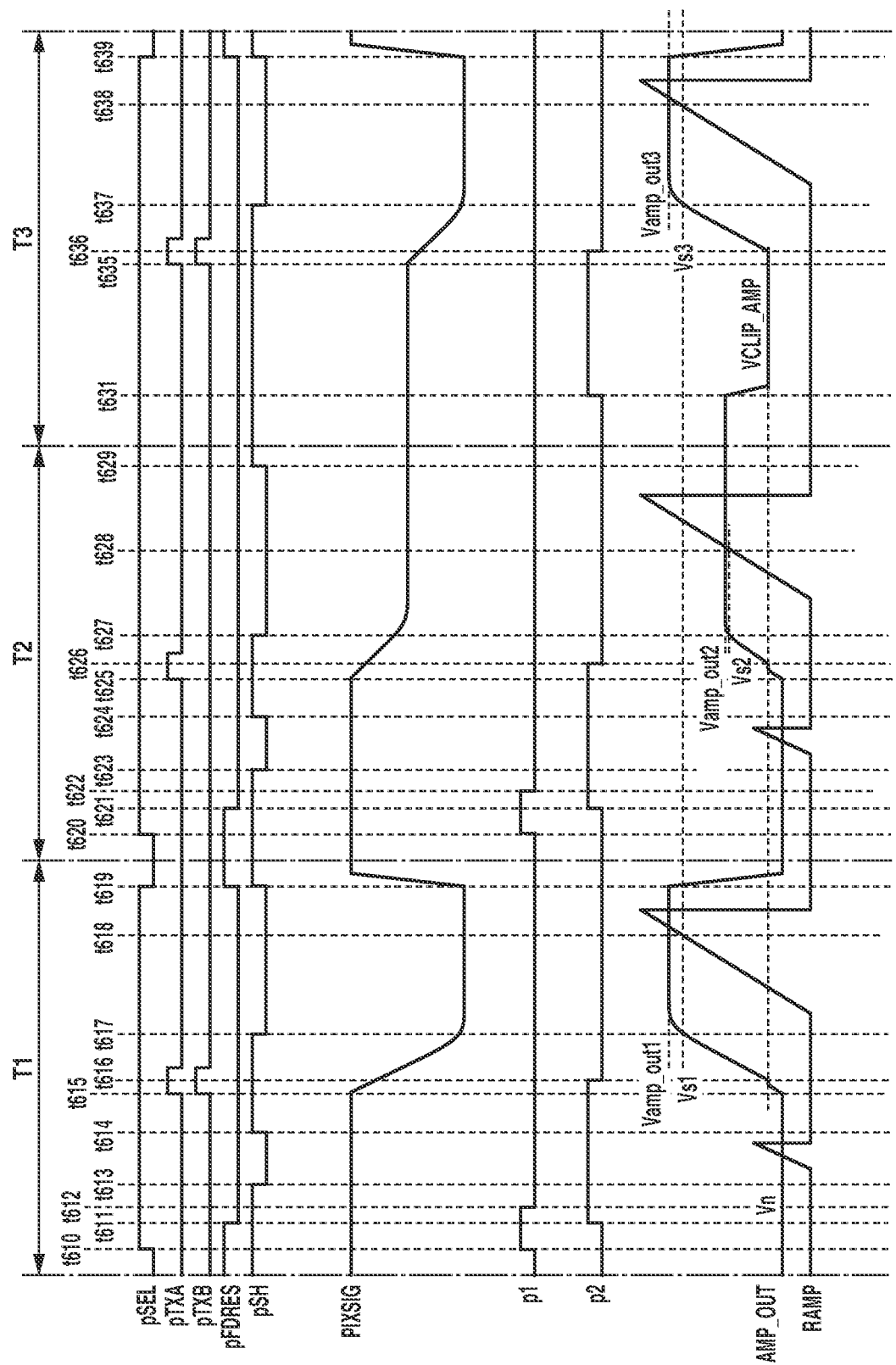
FIG. 6 is a timing diagram illustrating an operation of an image capturing apparatus according to the second exemplary embodiment.

FIG. 5 is a circuit diagram illustrating the readout circuit 102 according to the second exemplary embodiment. FIG. 6 is a timing diagram illustrating each operation timing of the image capturing apparatus according to the present exemplary embodiment and a transition of each of a voltage of each signal at the signal line 120 and a voltage AMP_OUT to be described below.

First, FIG. 5 will be described. Circuits in FIG. 5 that are denoted by the same reference symbols as those in FIG. 3 are similar to the circuits illustrated in FIG. 3, and thus the descriptions thereof are omitted.

The readout circuit 102 illustrated in FIG. 1 may include a unit circuit 1021 in place of the unit circuit 1020. The unit circuit 1021 includes an inverting amplifier 501. The inverting amplifier 501 outputs a signal obtained by amplifying a change in the voltage of the corresponding signal at the signal line 120 with a capacitance ratio between a capacitor element 503 (input capacitance) and a capacitor element 502 (feedback capacitance).

A switch 504 is a switch for allowing an inverting input terminal and the signal AMP_OUT, which is an output signal from the inverting amplifier 501, to be short-circuited and for initializing the inverting amplifier 501, the capacitor element 502, and the capacitor element 503. A power supply voltage VREF is input to a non-inverting input terminal of the inverting amplifier 501. The inverting input terminal and the non-inverting input terminal of the inverting amplifier 501 are virtually short-circuited. Accordingly, when the switch 504 is turned on and the signal AMP_OUT and the inverting input terminal are reset to the potential of the power supply voltage VREF.

A switch 505 and a switch 506 are switches for switching a voltage to be applied to the gate of a clip transistor 507 to fix the signal AMP_OUT to a predetermined voltage.

When the TG 111 switches a signal p2 to Hi level, the switch 505 is turned on. Thus, a voltage VCAN is applied to the gate of the clip transistor 507. When the TG 111 switches a signal p2B to Hi level, the switch 506 is turned on and a voltage VCAS is applied to the gate of the clip transistor 507.

A control circuit 520 is a block including the switches 505 and 506 and the clip transistor 507.

Next, an operation of the image capturing apparatus according to the present exemplary embodiment will be described with reference to FIG. 6.

Like in the first exemplary embodiment, the period T1 is a period in which the signal for image generation in the Nth row is read out. The period T2 is a period in which the signal for focus detection in the (N+1)th row is read out. The period T3 is a period in which the signal for image generation in the (N+1)th row is read out.

Redundant descriptions of the signal pSEL, the signal pTXA, the signal pTXB, and the signal pSH in each period that are similar to those in the first exemplary embodiment are partially omitted.

During a period from time t610 to time t612, a signal p1 becomes Hi level. Thus, the switch 504 is turned on and the output terminal and the inverting input terminal of the inverting amplifier 501 are short-circuited. Accordingly, the signal AMP_OUT, which is an output signal from the inverting amplifier 501, is initialized to the potential of the power supply voltage VREF connected to the non-inverting input terminal. Then, at a timing when the switch 504 is turned off, the potential (signal PIXSIG) of the corresponding signal at the signal line 120 at this time is clamped to the capacitor element 503. The inverting amplifier 501 amplifies the amount of change in the signal PIXSIG after that from the signal PIXSIG clamped at time 612 by the following equation (3), and outputs the amplification result.

$$\text{AMP\_OUT} = -\Delta \text{PIXSIG} \times (\text{capacitance value of the capacitor element 503/capacitance value of the capacitor element 502}) \quad (3)$$

Assume herein that ΔPIXSIG represents a variation of the signal PIXSIG from time t612.

At time t613, a signal pHS becomes Lo level and writing of the signal AMP_OUT into the capacitor element 312 is finished. This voltage is used as a signal of a reference level for the inverting amplifier 501 and each pixel 102, and is referred to as a signal Vn. The signal Vn is compared with the reference signal RAMP to thereby perform the AD conversion on the noise signal in the Nth row. This AD conversion is completed within a period of time t614 when the signal pSH is at Lo level.

At time t615, the signal pTXA and the signal pTXB become Hi level. Accordingly, the electric charges generated in the photoelectric conversion units 201 and 202 are transferred to the FD 208. From time t615, the signal PIXSIG starts to decrease due to the electric charges transferred to the FD 208, and the inverting amplifier 501 amplifies the change of the signal PIXSIG and outputs the amplified change to the signal AMP_OUT.

During a period from time t611 to time t616, the signal p2 becomes Hi level and the switch 505 is turned on. Thus, a gate voltage VCA1 of the clip transistor 507 reaches the voltage VCAN.

The signal p2B is a pulse signal having a phase opposite to that of the signal p2. Accordingly, when the signal p2 is at Hi level, the switch 505 is turned on and the switch 506 is turned off, so that VCA1=VCAN holds. When the signal p2 is at Lo level, the switch 505 is turned off and the switch 506 is turned on, so that VCA1=VCAN holds. In this ease, the following inequality (4) is obtained.

$$VCAN < VCAS \quad (4)$$

Accordingly, the signal AMP_OUT starts to change from time t615, but the clip transistor 507 is clipped to the voltage corresponding to the voltage VCAN.

The potential of the clipped signal AMP_OUT is referred to as a signal VCLIP_AMP.

Then, at time t616, the signal p2 becomes Lo level and the voltage VCA1 is switched from the voltage VCAN to the voltage VCAS. Accordingly, clipping of the signal AMP_OUT by the clip transistor 507 is released. Thus, the signal AMP_OUT starts to change again.

At time t617, the signal pSH becomes Lo level. The signal Vs1 corresponding to the potential of the signal AMP_OUT at this time is held by the capacitor element 312. After that, the signal AMP_OUT changes to the level of a signal $V_{amp\_out1}$ corresponding to the signal PIXSIG.

During a period from time t617 to time t619, the reference signal RAMP changes and the AD conversion is performed on the image capturing signal. At time t618, the magnitude relationship between the signal Vs1 and the reference signal RAMP is reversed. The count signal based on this timing is generated as the digital signal corresponding to the signal Vs1.

At time t619, the signal pFDRES becomes Hi level and the FD 208 is reset. Accordingly, the signal PIXSIG corresponding to the potential of the corresponding signal at the signal line 120 starts to increase toward the reset level.

Next, the period T2 will be described.

An operation daring a period from time t620 to time t625 is the same as the operation during a period from time t610 to time t615 in the period T1.

At time t625, the signal pTXA becomes Hi level and the electric charge generated in the photoelectric conversion unit 201 is transferred to the FD 208. Accordingly, the signal PIXSIG starts to change from the reset level, and the inverting amplifier 501 amplifies the change of the signal PIXSIG and outputs the amplified change to the signal AMP_OUT.

Because the signal p2 is at Hi level during a period from time t621 to time t626, like in the period T1, the signal AMP_OUT is clipped to the signal VCLIP_AMP corresponding to the voltage VCAN by the clip transistor 507. At time t626, the signal p2 becomes Lo level and the voltage VCA1 is switched to the voltage VCAS. As a result, clipping of the signal AMP_OUT to the signal VCLIP_AMP is released. Thus, the signal AMP_OUT starts to change again from time t626.

At time t627, the signal pSH becomes Lo level and the voltage Vs2 of the signal AMP_OUT at this time is held by the capacitor element 312. After that, signal AMP_OUT changes to the level of a signal Vamp_out2 corresponding to the signal PIXSIG.

During a period from time t627 to time t629, the reference signal RAMP is changed and the AD conversion is performed on the signal Vs2. At time t628, the magnitude relationship between the reference signal RAMP and the signal Vs2 is reversed. The count signal based on this timing is generated as the digital signal corresponding to the signal Vs2.

Next, the period T3 will be described.

At time t631, the TG 111 switches the signal p2 to Hi level. Thus, the signal AMP_OUT decreases from the signal Vamp_out2 to the signal VCLIP_AMP. Since the FD 208 is not reset in the period T3, the signal PIXSIG is maintained at the last potential in the period T2.

At time t635, the signal pTXA and the signal pTXB become Hi level and the electric charges generated in the photoelectric conversion units 201 and 202 are transferred to the FD 208. Thus, the signal PIXSIG starts to change.

In this case, the signal AMP_OUT is clipped to the signal VCLIP_AMP until the signal p2 becomes Lo level and the voltage VCA1 is switched from the voltage VCAN to the voltage VCAS at time t636. After clipping is released at time t636, the signal AMP_OUT changes along with the change of the signal PIXSIG.

At time t637, the signal pSH becomes Lo level. The signal Vs3 corresponding to the signal AMP_OUT at this time is held by the capacitor element 312. The signal AMP_OUT changes to the level of a signal Vamp_out3 corresponding to the signal PIXSIG.

During a period from time t637 to time t639, the reference signal RAMP is changed and the AD conversion is performed on the signal Vs3. At time t638, the magnitude relationship between the reference signal RAMP and the signal Vs3 is reversed. The count signal based on this timing is generated as the digital signal corresponding to the signal Vs3.

Throughout the periods T1, T2, and T3, the signal AMP_OUT is clipped to the signal VCLIP_AMP before the AD conversion. In other words, the signal AMP_OUT can start to change from the same level in the periods T1, T2, and T3.

Accordingly, the length of a period from a time when the signal p2 is switched to Lo level and clipping is released to a time when the signal pSH is switched to Lo level and the signal AMP_OUT is held by the capacitor element 312 can be made equal. As a result, the image capturing signal Vs1 subjected to the AD conversion in the Nth row and the image capturing signal Vs3 subjected to the AD conversion in the (N+1)th row satisfy the following approximation equation (5).

$$Vs1 \approx Vs3 \qquad (5)$$

Consequently, it is possible to suppress the deterioration in the accuracy of the image capturing signal depending on whether the signal for focus detection is output.

In the present exemplary embodiment, clipping of the signal AMP_OUT to the signal VCLIP_AMP is released during the period in which the signal pTXA is at Hi level. However, clipping may be released after the signal pTXA has changed from Hi level to Lo level.

Further, in the present exemplary embodiment, the capacitor element 312 is caused to hold a signal. However, as described in the first exemplary embodiment, the SH circuit 310 may be omitted, and even when the SH circuit 310 is provided, the holding operation may be omitted.

Differences between a third exemplary embodiment and the first exemplary embodiment will be mainly described.

Figure 7:
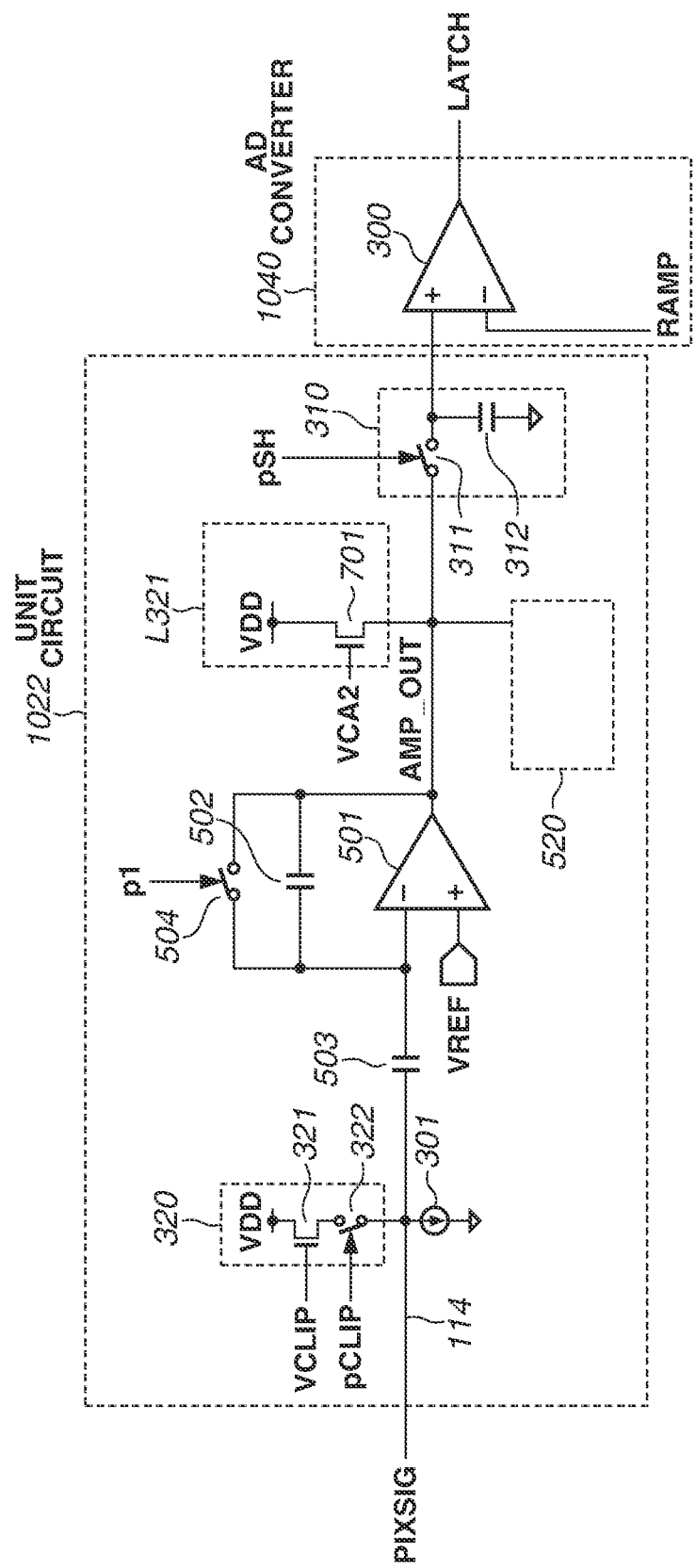
FIG. 7 is a circuit diagram illustrating configuration examples of the readout circuit and the AD conversion circuit according to a third exemplary embodiment.
Figure 8:
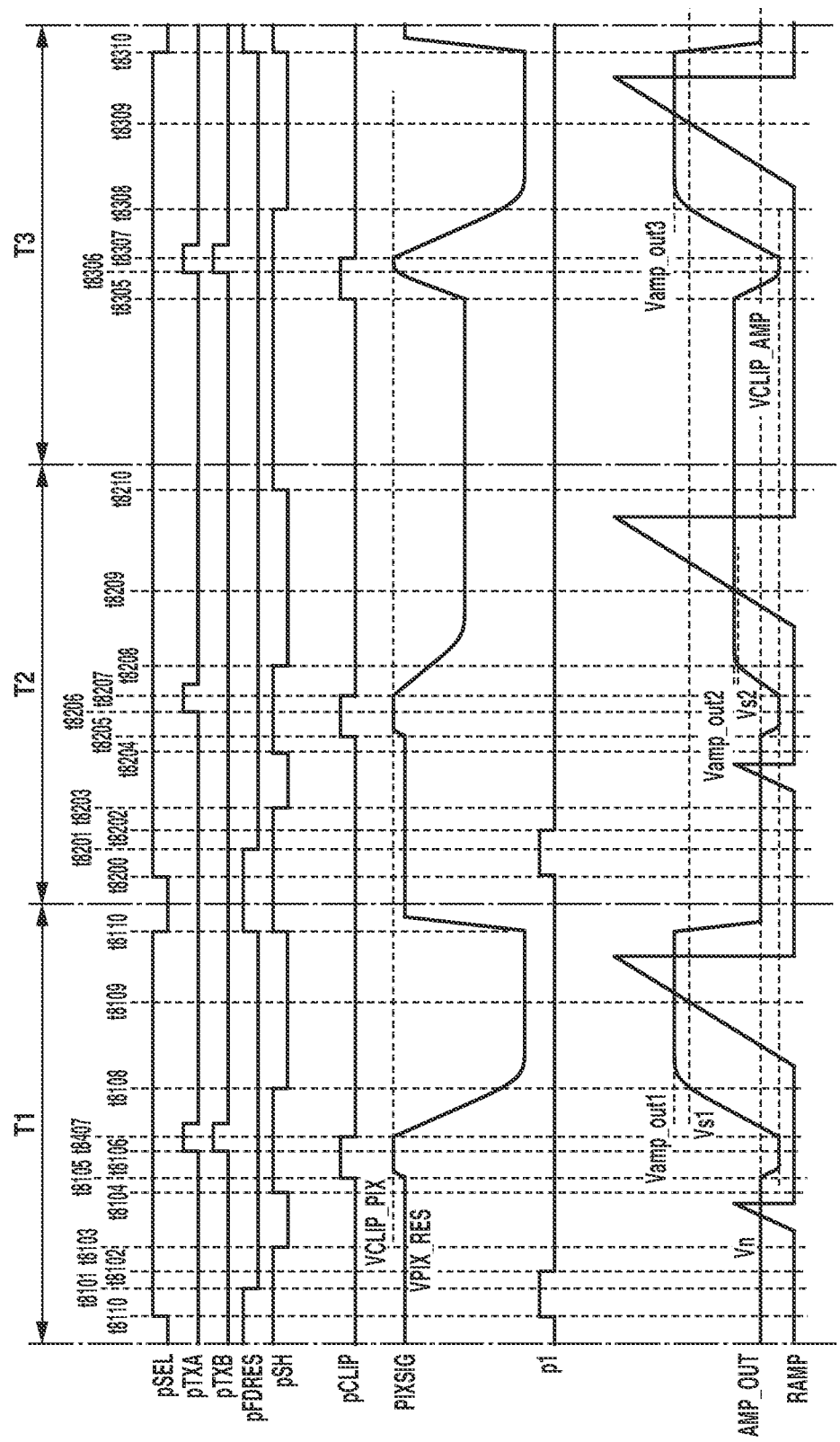
FIG. 8 is a timing diagram illustrating an operation of the image capturing apparatus according to the third exemplary embodiment.

FIG. 7 is a circuit diagram illustrating the readout circuit 102 according to the third exemplary embodiment. FIG. 8 illustrates an operation of the image capturing apparatus according to the present exemplary embodiment.

The image capturing apparatus according to the present exemplary embodiment includes a unit circuit 1022 illustrated in FIG. 7 in place of the unit circuit 1020.

Descriptions of elements in FIG. 7 that are denoted by the same reference symbols as those in FIGS. 3 and 5 are omitted.

The unit circuit 1022 illustrated in FIG. 7 includes a limiter circuit L321. The limiter circuit L321 includes a clip transistor 701. The clip transistor 701 is a clip transistor for clipping the signal AMP_OUT from the inverting amplifier 501 so as to prevent the signal AMP_OUT from decreasing to a level below a predetermined level. A voltage VCA2 is applied to the gate of the clip transistor 701. If the signal AMP_OUT decreases to a voltage level obtained by subtracting a threshold voltage of the clip transistor 701 and an overdrive voltage when the clip transistor 701 operates from the voltage VCA2, the signal AMP_OUT is clipped at the voltage level.

The voltage VCA2 is set such that the signal AMP_OUT to be clipped when the clip transistor 701 operates can be set to a voltage that falls within a saturation range of the transistor constituting the inverting amplifier 501.

Next, an operation of the image capturing apparatus according to the third exemplary embodiment will be described with reference to FIG. 8.

Operations of the signal pSEL, the signal pTXA, the signal pTXB, the signal pFDRES, and the signal p1 are similar to those of the first and second exemplary embodiments, and thus the detailed descriptions thereof are omitted.

First, the period T1 will be described.

At time t8101, the signal pFDRES becomes Lo level and the reset state of the FD 208 is released. In this case, the potential of the signal PIXSIG is represented as a signal VPIX_RES.

After that, during a period from time t8105 to time t8107, the signal pCLIP becomes Hi level and the clip transistor 321 is connected to the corresponding signal line 120 through the switch 322.

In this case, the gate voltage VCLIP of the clip transistor 321 is set to a voltage that satisfies the following equation and inequality (6).

$$VCLIP - Vth1 - \Delta Vov = VCLIP\_PIX,$$
$$VCLIP\_PIX > VPIX\_RES \qquad (6)$$

In equation and inequality (6), Vth1 represents a threshold voltage of the clip transistor 321, and $\Delta Vov$ represents an overdrive voltage when the clip transistor 321 operates. The signal VCLIP_PIX has a voltage at which the signal PIXSIG is clipped when the clip transistor 321 operates.

At time t8102, the signal p1 becomes Lo level. In this case, the signal VPIX_RES corresponding to the signal PIXSIG is clamped to the capacitor element 503. Accordingly, in this case, the signal AMP_OUT corresponds to the signal Vn having a potential obtained when the inverting amplifier 501 is initialized.

After that, the above-described operation from time t8105 to time t8107 allows the signal PIXSIG to change as represented by the following equation and inequality (7).

$$\Delta Vclippix = VCLIP\_PIX - VPIX\_RES > 0 \qquad (7)$$

Thus, the inverting input terminal of the inverting amplifier 501 changes to the positive side, so that the signal AMP_OUT decreases from the level of the signal Vn.

In this case, the clip transistor 701 disposed at the output side of the inverting amplifier 501 clips the signal AMP_OUT as represented by the following compound equation (8) so as to prevent the signal AMP_OUT from decreasing to a large extent.

$$AMP\_OUT = VCLIP\_AMP = VCA2 - Vth2 - \Delta Vov2 \qquad (8)$$

A target value of the voltage VCLIP_AMP is set such that the components of the inverting amplifier 501 can be set to a voltage within the saturation range. It may be desirable to adjust the voltage VCA2 so as to satisfy the target value.

At time t8107, the signal pCLIP becomes Lo level. Accordingly, the clip transistor 321 is disconnected from the corresponding signal line 120. In this case, clipping is released, thereby allowing the signal PIXSIG to start to change when the signal pTXA and the signal pTXB become Hi level and the electric charges are transferred from the photoelectric conversion units 201 and 202 to the FD 208 at time t8106.

As the signal PIXSIG changes, the signal AMP_OUT also starts to change from the level of the signal VCLIP_AMP toward the level of the signal Vamp_out1. In this case, the signal Vamp_out1 corresponds to the potential of the signal AMP_OUT when the amount of change of the signal PIXSIG corresponding to the electric charge read into the FD 208 is amplified by the inverting amplifier 501.

At time t8108, the signal pSH becomes Lo level. In this case, the signal AMP_OUT has not reached the level of the signal Vamp_out1 and the signal Vs1 corresponding to the signal AMP_OUT at this tine is held by the capacitor element 312.

During a period from time t8108 to time t8110, the reference signal RAMP is changed and the AD conversion is performed on the Nth row. At time t8109, the magnitude relationship between the reference signal RAMP and the signal Vs1 is reversed. The comparator 300 outputs the LATCH signal and completes the AD conversion on the signal Vs1.

Next, the period T2 will be described.

An operation during a period from time t8200 to time t8204 is the same as that during a period from time t8100 to time t8104 in the period T1, and thus the description thereof is omitted.

During a period from time t8205 to time t8207, the signal pCLIP becomes Hi level and the clip transistor 321 is connected to the corresponding signal line 120. The signal PIXSIG is clipped to the signal VCLIP_PIX. Along with this, like in the period T1, the signal AMP_OUT is clipped to the signal VCLIP_AMP.

At time t8207, the signal pCLIP becomes Lo level and the clip transistor 321 is disconnected from the corresponding signal line 120, so that clipping of the signal PIXSIG is released.

Accordingly, the signal PIXSIG starts to change when the signal pTXA becomes Hi level and the electric charge is transferred from the photoelectric conversion unit 201 to the FD 208 at time t8206.

As the signal PIXSIG changes, the signal AMP_OUT also starts to change from the level of signal VCLIP_AMP toward the level of the signal Vamp_out2. In this case, the signal Vamp_out2 corresponds to the signal AMP_OUT when the amount of change of the signal PIXSIG corresponding to the electric charge read into the FD 208 is amplified by the inverting amplifier 501.

At time t8208, the signal pSH becomes Lo level. In this case, the signal AMP_OUT has not reached the level of the signal Vamp_out2. The signal Vs2 corresponding to the signal AMP_OUT at this time is held by the capacitor element 312.

During a period from time t8208 to time t8210, the reference signal RAMP is changed and the AD conversion is performed on the signal for focus detection in the (N+1)th row. At time t8209, the magnitude relationship between the reference signal RAMP and the signal Vs2 is reversed and the comparator 300 outputs the LATCH signal and completes the AD conversion on the signal Vs2.

Next, the period T3 will be described.

During a period from time t8305 to time t8307, the signal pCLIP becomes Hi level and the clip transistor 321 is connected to the corresponding signal line 120.

In the period T3, the signal pFDRES is not included and the FD 208 is maintained in a state where the electric charge is transferred from the photoelectric conversion unit 201 in the period T2. Accordingly, in a period from time t8305 to time t8307, the signal PIXSIG changes to the signal VCLIP_PIX from the level when the corresponding pixel signal is read out in the period T2 by the clip transistor 321.

Along with this change, the signal AMP_OUT output from the inverting amplifier 501 changes from the level of the signal Vamp_out2 to the level of the signal VCLIP_AMP.

At time t8306, the signal pTXA and the signal pTXB become Hi level and the electric charges generated in the photoelectric conversion units 201 and 202 are transferred to the FD 208. The corresponding signal at the signal line 120 is clipped to the signal VCLIP_PIX by the clip transistor 321, and thus the signal level of the corresponding signal line 120 does not change.

At time t8307, the signal pCLIP becomes Lo level and the clip transistor 321 is disconnected from the corresponding signal line 120. Accordingly, the signal PIXSIG changes corresponding to the electric charge transferred to the FD 208 at time t8306.

Along with this change, the signal AMP_OUT, which is an output signal from the inverting amplifier 501, also starts to change toward the level of the signal Vamp_out3.

The signal Vamp_out3 corresponds to the signal AMP_OUT obtained when the amount of change of the signal PIXSIG corresponding to the electric charge read into the FD 208 is amplified by the inverting amplifier 501.

At time t8308, the signal pSH becomes Lo level. In this case, the signal AMP_OUT has not reached the signal Vamp_out3, and the signal Vs3 corresponding to the signal AMP_OUT at this time is held by the capacitor element 312.

During a period from time t8308 to time t8310, the reference signal RAMP is changed and the AD conversion is performed on the image capturing signal in the (N+1)th row. At time t8309, the reference signal RAMP and the signal Vs3 cross each other and the comparator 300 outputs the LATCH signal and completes the AD conversion on the image capturing signal.

In this case, the voltage VCLIP at the gate of the clip transistor 321 and the voltage VCA2 at the gate of the clip transistor 701 are set to satisfy the following inequality (9).

(VCLIP_PIX−VPIX_RES)×(capacitance value of the capacitor element 503/capacitance value of the capacitor element 502)>Vn−VCLIP_AMP    (9)

Thus, the signal AMP_OUT can be clipped to the signal VCLIP_AMP.

As described above, before the AD conversion in each of the period T1, the period T2, and the period T3 is started, the signal PIXSIG is clipped to the predetermined voltage VCLIP_PIX and the signal AMP_OUT is also clipped to the predetermined voltage VCLIP_AMP.

Accordingly, the period in which the corresponding signal at the signal line 120 (PIXSIG) and the output signal AMP_OUT from the inverting amplifier 501 are stabilized can be made substantially equal in the period T1 and the period T3. Accordingly, the following approximation equation (10) can be obtained.

$$Vs1 \approx Vs3 \qquad (10)$$

Thus, the image capturing signal subjected to the AD conversion in the period T1 and the image capturing signal subjected to the AD conversion in the period T3 can be set to substantially the same level. Therefore, it is possible to suppress the deterioration in an image due to characteristic differences between the period T1 and the period T3 and to provide a satisfactory image.

In the present exemplary embodiment, clipping of the signal AMP_OUT to the signal VCLIP_AMP is released during the period in which the signal pTXA is at Hi level. However, clipping may be released after the signal pTXA changes from Hi level to Lo level.

In the present exemplary embodiment, a signal is sampled and held by the capacitor element 312. However, as described in the first and second exemplary embodiments, there is no need to use the sampling and holding function. In this case, the length of a period from a time when clipping of the signal AMP_OUT to the signal VCLIP_AMP is released to a time when the AD conversion is started is matched between at least the period T1 and the period T3, thereby making it possible to obtain the same advantageous effect as the advantageous effect described in the present exemplary embodiment.

While FIG. 7 illustrates the control circuit 520, the control circuit 520 may be omitted in the present exemplary embodiment. However, as described in the second exemplary embodiment, the control circuit 520 may be used in combination with the present exemplary embodiment.

Figure 9:
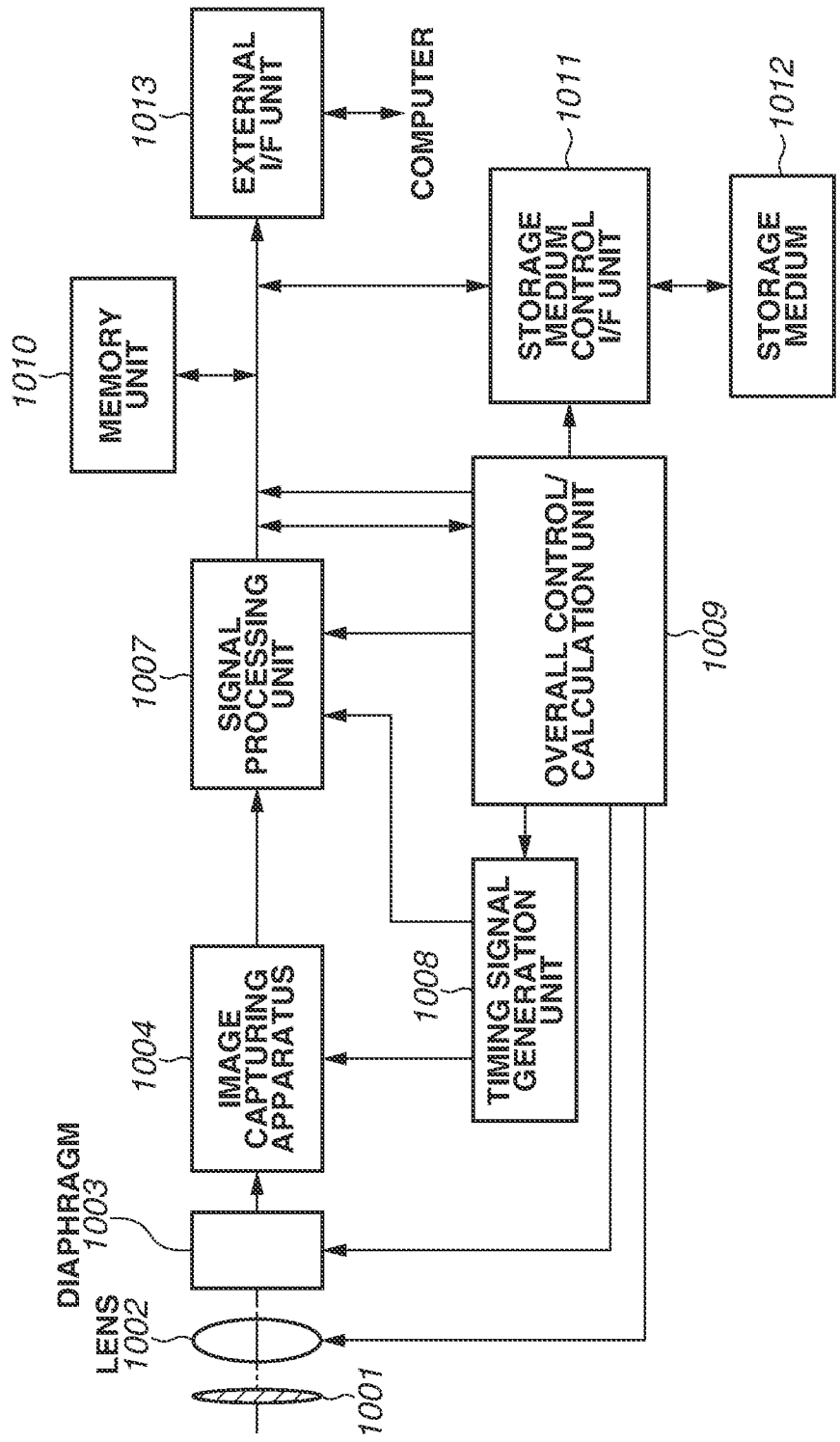
FIG. 9 is a block diagram illustrating a schematic configuration of a photoelectric conversion system according to a fourth exemplary embodiment.

A photoelectric conversion system according to a fourth exemplary embodiment will be described with reference to FIG. 9. FIG. 9 is a block diagram illustrating a schematic configuration of the photoelectric conversion system according to the present exemplary embodiment.

The image capturing apparatuses described in the first to third exemplary embodiments described above can be applied to various types of photoelectric conversion systems. Examples of the applicable photoelectric conversion systems include a digital still camera, a digital camcorder, a monitoring camera, a copying machine, a facsimile machine, a mobile phone, an on-vehicle camera, and an observation satellite. Examples of the applicable photoelectric conversion systems also include a camera module including an optical system, such as a lens, and an image capturing apparatus. FIG. 9 is a block diagram illustrating a digital still camera as an example of the photoelectric conversion systems.

The photoelectric conversion system illustrated in FIG. 9 includes an image capturing apparatus 1004, a lens 1002 that forms an optical image of an object on the image capturing apparatus 1004, a diaphragm 1003 for varying the amount of light that passes through the lens 1002, and a barrier 1001 for protecting the lens 1002. The lens 1002 and the diaphragm 1003 are optical systems that focus light on the image capturing apparatus 1004. The image capturing apparatus 1004 is a photoelectric conversion apparatus (image capturing apparatus) according to any one of the above-described exemplary embodiments and converts the optical image formed on the lens 1002 into an electric signal.

The photoelectric conversion system also includes a signal processing unit 1007 serving as an image generation unit that generates an image by performing processing on an output signal output from the image capturing apparatus 1004. The signal processing unit 1007 performs an operation for performing various correction and compression processes, as needed, and outputting image data. The signal processing unit 1007 may be formed on a semiconductor substrate on which the image capturing apparatus 1004 is provided, or may be formed on another semiconductor substrate different from the semiconductor substrate on which the image capturing apparatus 1004 is provided. The image capturing apparatus 1004 and the signal processing unit 1007 may be formed on the same semiconductor substrate.

The photoelectric conversion system further includes a memory unit 1010 for temporarily storing image data, and an external interface (I/F) unit 1013 for communicating with an external computer or the like. The photoelectric conversion system further includes a storage medium 1012, such as a semiconductor memory for storing or reading out image capturing data, and a storage medium control I/F unit 1011 for storing data into the storage medium 1012 or reading out data from the storage medium 1012. The storage medium 1012 may be incorporated in the photoelectric conversion system or may be detachably mounted on the photoelectric conversion system.

The photoelectric conversion system further includes an overall control/calculation unit 1009 serving as a control unit that controls various calculations and the overall operation of the digital still camera, and a timing signal generation unit 1008 that outputs various timing signals to the image capturing apparatus 1004 and the signal processing unit 1007. In this case, the timing signals and the like may be input from an external apparatus, and the photoelectric conversion system may include at least the image capturing apparatus 1004 and the signal processing unit 1007 that processes the output signal output from the image capturing apparatus 1004.

The image capturing apparatus 1004 outputs an image capturing signal to the signal processing unit 1007. The signal processing unit 1007 performs predetermined signal processing on the image capturing signal output from the image capturing apparatus 1004, and outputs image data. The signal processing unit 1007 generates an image using the image capturing signal.

Thus, according to the present exemplary embodiment, the photoelectric conversion system to which the photoelectric conversion apparatus (image capturing apparatus) according to any one of the above-described exemplary embodiments is applied can be achieved.

Figure 10A:
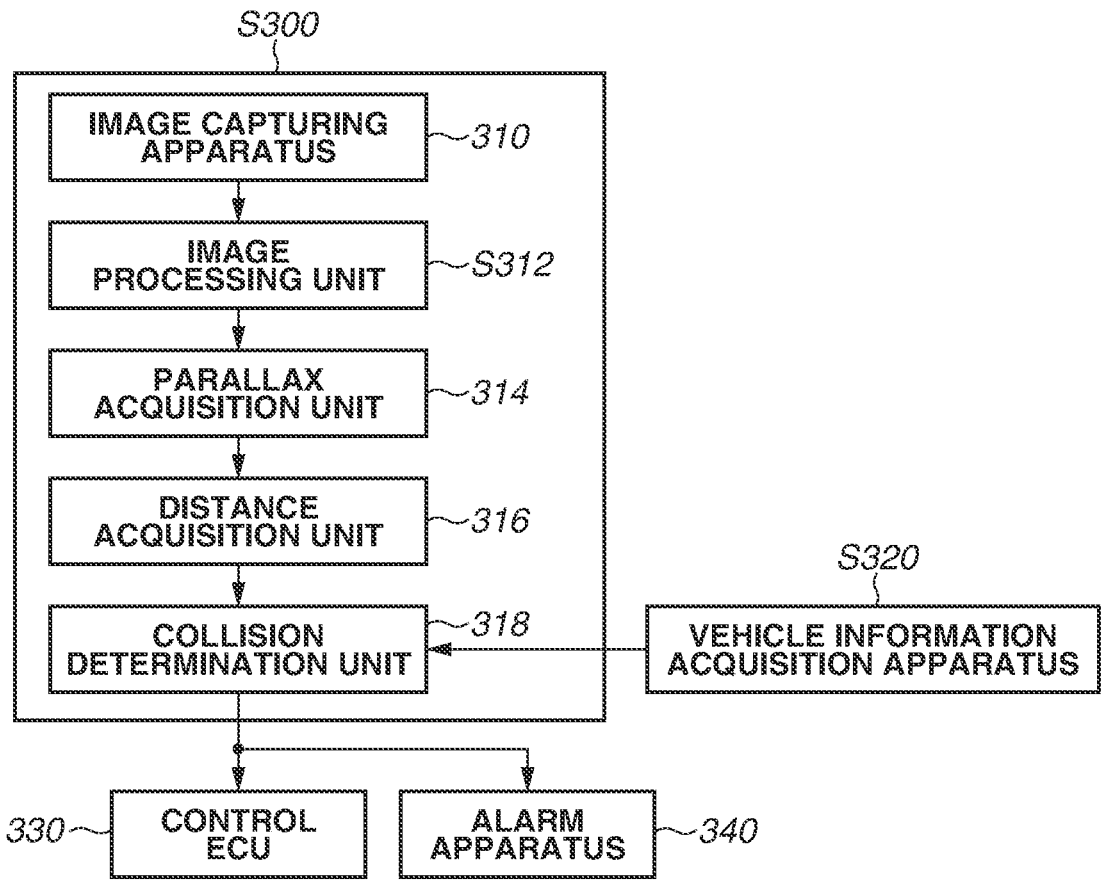
FIG. 10A is a block diagram illustrating a configuration example of a photoelectric conversion system according to a fifth exemplary embodiment.
Figure 10B:
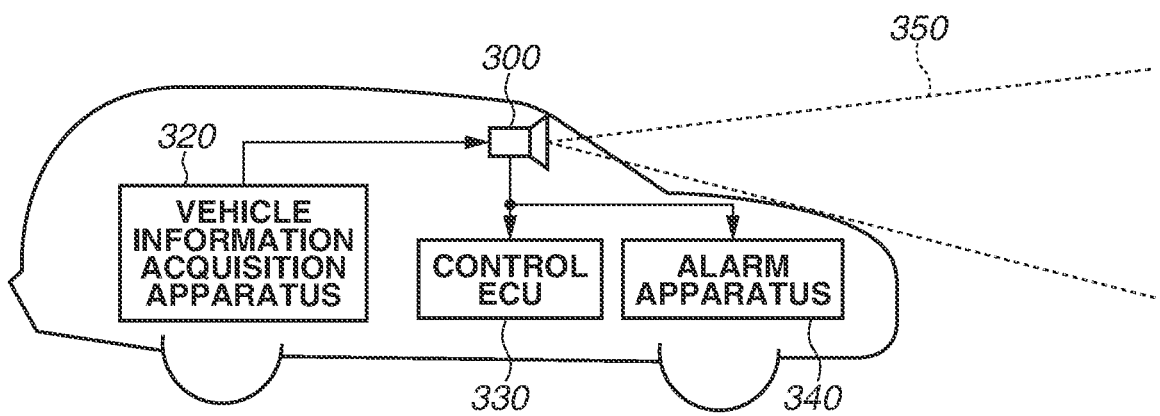
FIG. 10B is a schematic diagram illustrating a configuration example of the photoelectric conversion system and a moving body according to the fifth exemplary embodiment.

A photoelectric conversion system and a moving body according to a fifth exemplary embodiment will be described with reference to FIGS. 10A and 10B. FIG. 10A is a block diagram illustrating a configuration example of a photoelectric conversion system according to the present exemplary embodiment, and FIG. 10B is a schematic diagram illustrating a configuration example of the photoelectric conversion system and a moving body according to the present exemplary embodiment.

FIG. 10A illustrates an example of a photoelectric conversion system for an on-vehicle camera. A photoelectric conversion system S300 includes an image capturing apparatus 310. The image capturing apparatus 310 is a photoelectric conversion apparatus (image capturing apparatus) according to any one of the exemplary embodiments described above. The photoelectric conversion system S300 also includes an image processing unit S312 that performs image processing on a plurality of pieces of image data acquired by the image capturing apparatus 310, and a parallax acquisition unit 314 that calculates a parallax (phase difference between parallax images) based on the plurality of pieces of image data acquired by the photoelectric conversion system S300. The photoelectric conversion system S300 further includes a distance acquisition unit 316 that calculates a distance to an object based on the calculated parallax, and a collision determination unit 318 that determines the possibility of occurrence of a collision based on the calculated distance. In this case, the parallax acquisition unit 314 and the distance acquisition unit 316 are examples of a distance information acquisition unit that acquires distance information about a distance to an object. Specifically, the distance information is information about a parallax, a defocus amount, a distance to an object, or the like. The collision determination unit 318 may determine the possibility of occurrence of a collision by using any one of the pieces of distance information. The distance information acquisition unit may be implemented by exclusively designed hardware, or may be implemented by a software module. The distance information acquisition unit may also be implemented by a field programmable gate array (FPGA), an application specific integrated circuit (ASIC), or the like, or a combination thereof.

The photoelectric conversion system S300 is connected to a vehicle information acquisition apparatus S320, and can acquire vehicle information such as a vehicle speed, a yaw rate, or a steering angle. The photoelectric conversion system S300 is also connected to a control ECU 330 serving as a control unit that outputs a control signal for generating a breaking force on a vehicle based on the determination result from the collision determination unit 318. The photoelectric conversion system S300 is also connected to an alarm apparatus 340 that issues an alarm to a driver based on the determination result from the collision determination unit 318. For example, if it is highly likely that a collision may occur based on the determination result from the collision determination unit 318, the control ECU 330 performs a vehicle control for avoiding a collision or reducing a damage by, for example, applying a brake, releasing an accelerator, or suppressing an engine output. The alarm apparatus 340 issues an alarm to a user by, for example, issuing an alarm such as sound, displaying alarm information on a screen of a car navigation system or the like, or applying a vibration to a seat belt or a steering wheel.

In the present exemplary embodiment, the photoelectric conversion system S300 captures an image of the periphery of the vehicle, for example, the front or the back of the vehicle. FIG. 10B illustrates a configuration example of the photoelectric conversion system S300 when an image of a front portion (image capturing range 350) of the vehicle is captured. The vehicle information acquisition apparatus S320 sends an instruction to the photoelectric conversion system S300 or the image capturing apparatus 310. With this configuration, the ranging accuracy can be further improved.

While the above-described exemplary embodiments illustrate an example of the control operation for preventing the vehicle from colliding with another vehicle, the present exemplary embodiment can also be applied to, for example, a control operation for automatic driving by following another vehicle, and a control operation for automatic driving to prevent the vehicle from deviating from a lane. Further, the photoelectric conversion system S300 is not limited to a vehicle, such as the vehicle in which the photoelectric conversion system S300 is mounted, but also can be applied to, for example, a moving body (moving apparatus), such as a ship, an aircraft, or an industrial robot. In addition, the photoelectric conversion system S300 is not limited to a moving body, but also can be applied to devices that widely use object recognition, such as an intelligent transportation system (ITS).

Modified Examples of Exemplary Embodiments

The disclosure is not limited to the above-described exemplary embodiments and can be modified in various ways.

For example, an example where some of the components according to one of the exemplary embodiments are added to any other exemplary embodiment, and an example where some of the components according to one of the exemplary embodiments are replaced with some of the components according to any other exemplary embodiment are also included in the exemplary embodiments of the disclosure.

The photoelectric conversion systems according to the fourth and fifth exemplary embodiments described above are examples of the photoelectric conversion system to which the photoelectric conversion apparatus according to the disclosure can be applied. The photoelectric conversion system to which the photoelectric conversion apparatus according to the disclosure can be applied is not limited to the configurations illustrated in FIG. 9 and FIGS. 10A and 10B.

The exemplary embodiments described above merely illustrate specific examples for carrying out the present disclosure, and the technical scope of the disclosure should not be interpreted in a limitative manner by the exemplary embodiments. In other words, the disclosure can be implemented in various forms without departing from the technical idea of the disclosure or the principal features of the disclosure.

The disclosed content of the present specification also includes complementary sets of concepts described in the present specification. Specifically, if there is a description in the present specification to the effect that "A is B" (A=B), for example, it is assumed that the present specification discloses or suggests to the effect that "A is not B", even if a description to the effect that "A is not B" (A≠B) is omitted. This is because it is a premise that a description to the effect that "A is B" takes into consideration a case in which "A is not B".

According to the present disclosure, it is possible to suppress the deterioration in the accuracy of the signal for image generation.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-201485, filed Dec. 4, 2020, which is hereby incorporated by reference herein in its entirety.

What is claimed is:

1. An image capturing apparatus comprising:
   a plurality of pixels;
   a signal line connected to the plurality of pixels; and
   a limiter circuit configured to limit an amplitude of a signal at the signal line,
   wherein a first pixel in the plurality of pixels sequentially outputs a noise signal, a focus detection signal, and an image capturing signal to the signal line, and a second pixel in the plurality of pixels sequentially outputs a noise signal and an image capturing signal to the signal line, and
   wherein a potential of the signal at the signal line is set to a potential by the limiter circuit during a period after the second pixel outputs the noise signal and before the second pixel outputs the image capturing signal.

2. The image capturing apparatus according to claim 1, wherein the limiter circuit limits a range in which the potential of the second line is variable during a period in which the focus detection signal is output to the signal line.

3. The image capturing apparatus according to claim 1, wherein the limiter circuit limits a range in which the potential of the signal at the signal line is variable during a period in which the image capturing signal from the first pixel and the image capturing signal from the second pixel are output to the signal line.

4. The image capturing apparatus according to claim 2, wherein the limiter circuit limits a range in which the potential of the signal at the signal line is variable during a period in which the image capturing signal from the first pixel and the image capturing signal from the second pixel are output to the signal line.

5. The image capturing apparatus according to claim 1, wherein the limiter circuit limits a range in which the potential of the signal at the signal line is variable during a period in which the noise signal from the first pixel and the noise signal from the second pixel are output to the signal line.

6. The image capturing apparatus according to claim 2, wherein the limiter circuit limits a range in which the potential of the signal at the signal line is variable during a period in which the noise signal from the first pixel and the noise signal from the second pixel are output to the signal line.

7. The image capturing apparatus according to claim 3, wherein the limiter circuit limits a range in which the potential of the signal at the signal line is variable during a period in which the noise signal from the first pixel and the noise signal from the second pixel are output to the signal line.

8. An image capturing apparatus comprising:
a plurality of pixels included in each of a plurality of photoelectric conversion units;
a signal line to which the plurality of pixels is connected; and
a limiter circuit configured to limit an amplitude of a signal at the signal line,
wherein a first pixel in the plurality of pixels sequentially outputs a noise signal, a first signal, and a second signal to the signal line, the first signal being based on an electric charge from some of the plurality of photoelectric conversion units, the second signal being based on an electric charge from the plurality of photoelectric conversion units,
wherein a second pixel in the plurality of pixels outputs a noise signal and a third signal to the signal line, the third signal being based on the electric charge from the plurality of photoelectric conversion units, and
wherein a potential of the signal at the signal line is set to a potential by the limiter circuit during a period after the second pixel outputs the noise signal and before the second pixel outputs the third signal.

9. The image capturing apparatus according to claim 8, wherein one microlens is provided corresponding to the plurality of photoelectric conversion units.

10. The image capturing apparatus according to claim 8, wherein the limiter circuit limits a range in which the potential of the signal at the signal line is variable during a period in which the first signal is output to the signal line.

11. The image capturing apparatus according to claim 9, wherein the limiter circuit limits a range in which the potential of the signal at the signal line is variable during a period in which the first signal is output to the signal line.

12. The image capturing apparatus according to claim 8, wherein the limiter circuit limits a range in which the potential of the signal at the signal line is variable during a period in which the second signal and the third signal are output to the signal line.

13. The image capturing apparatus according to claim 9, wherein the limiter circuit limits a range in which the potential of the signal at the signal line is variable during a period in which the second signal and the third signal are output to the signal line.

14. The image capturing apparatus according to claim 10, wherein the limiter circuit limits a range in which the potential of the signal at the signal line is variable during a period in which the second signal and the third signal are output to the signal line.

15. The image capturing apparatus according to claim 5, wherein the limiter circuit limits a range in which the potential of the signal at the signal line is variable during a period in which the noise signal from the first pixel and the noise signal from the second pixel are output to the signal line.

16. A photoelectric conversion system comprising:
an image capturing apparatus according to claim 1; and
a signal processing unit configured to generate an image using a signal output from the image capturing apparatus.

17. A photoelectric conversion system comprising:
an image capturing apparatus according to claim 8; and
a signal processing unit configured to generate an image using a signal output from the image capturing apparatus.

18. A moving body comprising:
an image capturing apparatus according to claim 1; and
a control unit configured to control a movement of the moving body using a signal output from the image capturing apparatus.

19. A moving body comprising:
an image capturing apparatus according to claim 8; and
a control unit configured to control a movement of the moving body using a signal output from the image capturing apparatus.

* * * * *